(12) United States Patent  
Russo et al.

(10) Patent No.: US 9,154,515 B1  
(45) Date of Patent: Oct. 6, 2015

(54) SYSTEMS AND METHODS IDENTIFYING AND REACTING TO POTENTIALLY MALICIOUS ACTIVITY

(71) Applicant: AMAZON TECHNOLOGIES, INC., Reno, NV (US)

(72) Inventors: Francesco Russo, Dublin (IE); Dominique Imjya Brezinski, Seattle, WA (US); Robert Hanna Mahfoud, Mercer Island, WA (US); Martin Matthew O'Reilly, Dublin (IE)

(73) Assignee: Amazon Technologies, Inc., Reno, NV (US)

( * ) Notice: Subject to any disclaimer, the term of this patent is extended or adjusted under 35 U.S.C. 154(b) by 6 days.

(21) Appl. No.: 14/134,596

(22) Filed: Dec. 19, 2013

(51) Int. Cl.
  *G06F 21/56* (2013.01)
  *H04L 29/06* (2006.01)

(52) U.S. Cl.
  CPC ............ *H04L 63/1416* (2013.01); *G06F 21/56* (2013.01); *H04L 63/1441* (2013.01)

(58) Field of Classification Search
  None
  See application file for complete search history.

(56) References Cited

U.S. PATENT DOCUMENTS

| | | | | |
|---|---|---|---|---|
| 7,735,116 | B1 * | 6/2010 | Gauvin | 726/2 |
| 8,370,942 | B1 * | 2/2013 | Peterson et al. | 726/24 |
| 8,458,301 | B1 * | 6/2013 | Andrus et al. | 709/220 |
| 2004/0073810 | A1 * | 4/2004 | Dettinger et al. | 713/201 |
| 2007/0209075 | A1 * | 9/2007 | Coffman | 726/23 |
| 2009/0328160 | A1 * | 12/2009 | Webb-Johnson | 726/4 |
| 2010/0077481 | A1 * | 3/2010 | Polyakov et al. | 726/24 |
| 2011/0219451 | A1 * | 9/2011 | McDougal et al. | 726/23 |
| 2013/0031037 | A1 * | 1/2013 | Brandt et al. | 706/12 |
| 2013/0305368 | A1 * | 11/2013 | Ford | 726/23 |
| 2014/0047544 | A1 * | 2/2014 | Jakobsson | 726/23 |
| 2015/0128205 | A1 * | 5/2015 | Mahaffey et al. | 726/1 |

* cited by examiner

*Primary Examiner* — Jung Kim
*Assistant Examiner* — Adrian Stoica
(74) *Attorney, Agent, or Firm* — Lindauer Law, PLLC

(57) ABSTRACT

Information security may include defending information from unauthorized access, use, disclosure, modification, destruction, and so forth. Described herein are systems, methods and devices for enabling a user device to implement functions for dynamically identifying and reacting to potentially malicious activity. In one example, a user device configures a sentinel node to identify potentially malicious behavior by causing the sentinel node to analyze data from selected emitter nodes and selected algorithms. The user device may also specify how the sentinel node reacts to potential malicious activity.

20 Claims, 12 Drawing Sheets

SYSTEMS AND METHODS IDENTIFYING AND REACTING TO POTENTIALLY MALICIOUS ACTIVITY

BACKGROUND

Information security may include defending information from unauthorized access, use, disclosure, modification, destruction, and so forth. As information processing systems continue to grow in size and complexity, identifying and reacting to malicious acts associated with secure information has become challenging.

Figure 1:
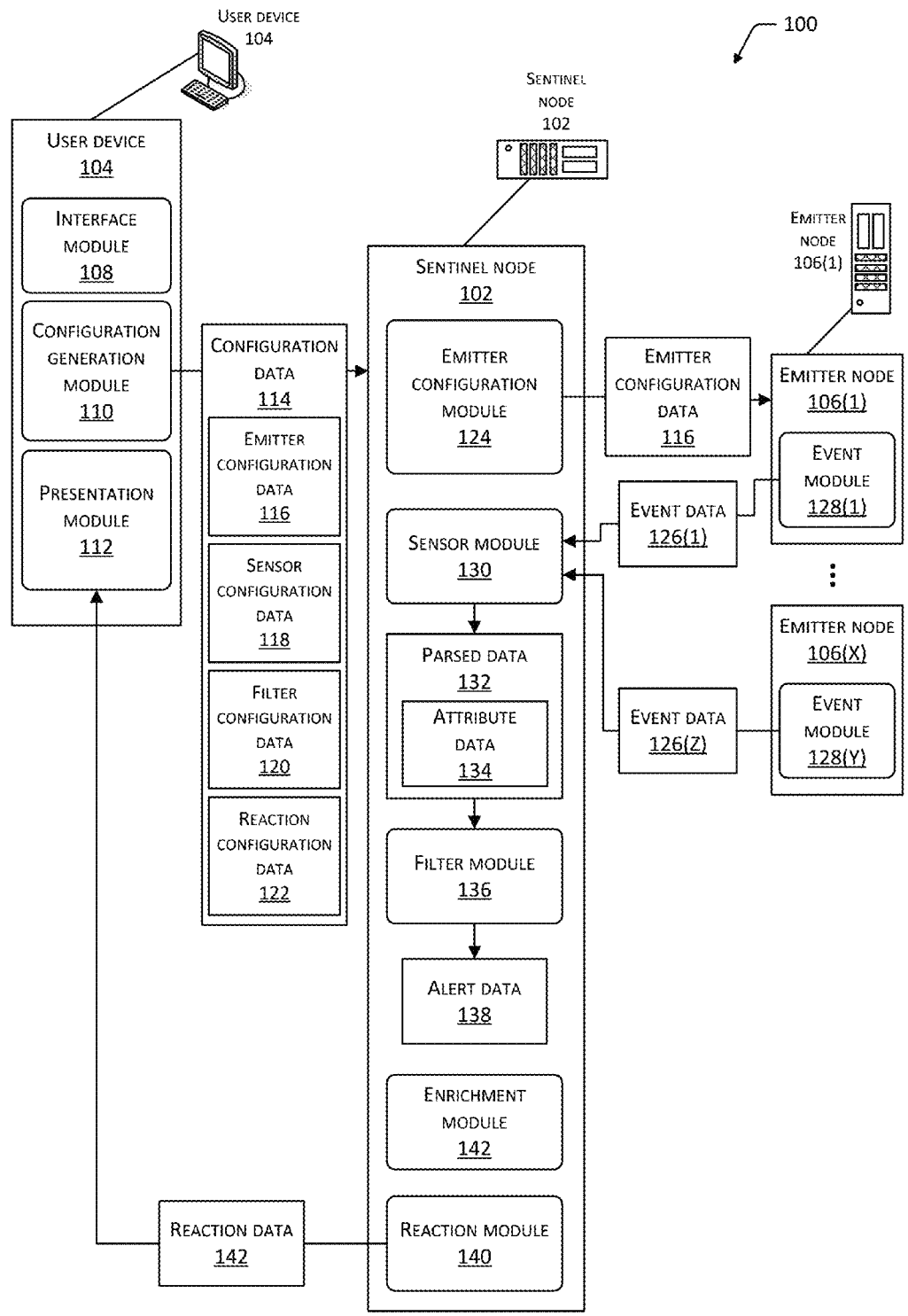
FIG. 1 is a block diagram of a system configured to generate alert data based on parsed data including attribute data.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

Information security may include defending information from malicious acts. Malicious acts may include, for example, unauthorized access, use, disclosure, modification, destruction, and so forth. As information processing systems continue to grow in size and complexity, identifying and reacting to malicious acts associated with secure information has become challenging.

This disclosure relates to systems and methods for dynamically identifying and reacting to malicious or potentially malicious acts associated with secure information. A sentinel node is configured to determine whether malicious activity or a potential malicious activity has occurred. The sentinel node is made up of one or more computing nodes, which can perform functions described in this disclosure. The computing nodes may comprise one or more computing devices. These functions may be executed as one or more services. As described in more detail below, the sentinel node may include an emitter portion, a sensor portion, a filter portion, and a reaction portion.

The emitter portion may comprise emitter nodes configured to generate and provide event data. The event data may represent various information about activities associated with emitter nodes. The event data may comprise recorded information about one or more activities. The event data may comprise at least one of data indicating that information has been accessed, data indicating that information was transferred to the computing device, data indicating that information was modified, and so forth. The emitter nodes may comprise computing nodes having computing devices configured to implement certain functions described in this disclosure as one or more services.

In some implementations, the event data includes event entries. A particular event entry may comprise data about an activity associated with an emitter node. For example, generated event data may include a first event entry indicating that a particular computing device has been accessed, and a second event entry indicating the user that accessed the particular computing device.

The sensor portion may use the event entries to generate parsed data. The parsed data may be described as transformed, normalized or otherwise processed event data. The sensor portion may comprise one or more sensor modules configured to implement certain functions described in this disclosure as one or more services. By transforming the event data into parsed data, the sentinel node may consume large volumes of different types of event data in near real time. As used in this disclosure, near real time may be a period of time less than or equal to twenty seconds. Transforming the event data into parsed data in real time or near real time may include allocating the event data to certain data processing modules when the event data is received by the sentinel node. Transforming the event data into parsed data in real time or near real time may include generating parsed data as the event data is received by the sentinel node.

The event data may be transformed into parsed data as instantaneously as possible. The amount of time to transform the event data may be limited by various factors. The factors may include the ability to receive the event data, the ability of the hardware or software to receive or access the event data and perform the transformation, and so forth.

In some implementations, the event data is transformed into parsed data in real time or near real time because the sentinel node performs the transformation as the sentinel node receives the event data. Once the sentinel node receives the event data, the sentinel node may perform its functions by maintaining the event data in the primary system memory, as compared to the secondary system memory. Due to faster read/write times, reduced contention, or other factors, data transfer with the primary system memory is greater than the secondary system memory. As a result, the time for processing the event data is reduced compared to systems which rely on storage in the secondary system memory. This may reduce overall processing time, allowing the event data to be transformed into parsed data in real time or near real time as the sentinel node receives the event data.

Transforming the event data into parsed data in near real time may be described as transforming the event data substantially immediately once the sentinel node receives the event data. In some examples, substantially immediately may be described as within a designated period of time, such as five seconds.

The parsed data may represent various information about activities associated with emitter nodes. For example, the parsed data may comprise at least one of data indicating the user or computing device that performed an action, data indicating the action which has been performed, and data indicating the entity that the action was performed on. The parsed data may also include attribute data which may represent various other information about activities associated with emitter nodes. For example, the attribute data may comprise information identifying the time in which a particular action took place, information identifying the protocol used to perform a particular network connection.

The filter portion may comprise one or more filter modules configured to generate alert data. The alert data may represent an occurrence of a malicious activity or a potentially malicious activity. A potentially malicious activity may comprise a malicious activity. In one example, the filter module may generate the alert data in response to a determination that a particular user accessed a designated computing device.

The reactor portion may comprise one or more reaction modules configured to generate reaction data. The reaction data may comprise information about one or more responses to the occurrence of the malicious or potentially malicious activity. In one example, the one or more responses include providing a notification to a designated user device indicating the occurrence of a potentially malicious activity.

Users, such as internal business users, may configure the emitter portion, the sensor portion, the filter portion, and the reaction portion. A user device may include a user interface configured to receive inputs for configuring the emitter portion, the sensor portion, the filter portion, and the reaction portion. Based on the received inputs, the user device may generate configuration data comprising information about configuring the emitter portion, the sensor portion, the filter portion, and the reaction portion. The configuration data enables the user of the user device to continuously make changes as to how certain components of the sentinel node will function. Once the configuration data is generated, the user device may provide the configuration data to the sentinel node.

The configuration data may include emitter configuration data comprising information causing one or more emitter nodes to provide the event data to the sentinel node. Based on inputs provided by a user, the sentinel node may receive different emitter configuration data at different times, which may cause the emitter nodes to start and stop providing the event data. By enabling the user to select which emitter nodes will provide the event data, the sentinel node may analyze more relevant data, resulting in a more efficient process.

The configuration data may include sensor configuration data comprising information about selecting one or more attributes to be generated by the sensor portion. In one example, the attributes include information identifying the computing device that performed an action, information identifying the action that was performed, and information identifying the time the action was performed. The sensor configuration data may cause the sensor module to map the information identifying the computing device, the time the action was performed, and the information identifying the action that was performed to one or more designated fields. This process may be described as normalizing or transforming the event data into the parsed data. By enabling the user to select which information to analyze, the filter module may analyze more relevant data, resulting in a more efficient process.

The configuration data may include filter configuration data comprising information about selecting an algorithm or function for analyzing the one or more attributes. The algorithm may comprise a logical arithmetical or computational process. In some implementations, the filter module applies the selected algorithm to the parsed data to determine whether a malicious or potentially malicious activity has occurred. For example, the selected algorithm may comprise information about determining the amount of attempted logins by a specific user within a designated time. The filter module may apply the algorithm to the parsed data and determine that a particular user has unsuccessfully attempted to logon to a machine twenty times within the last two minutes, indicating a potentially malicious act. By enabling the user to select which algorithm to be applied in the analysis, the filter module may conduct more relevant analysis, resulting in more identification of malicious or potentially malicious acts.

The configuration data may include reaction configuration data comprising information about selecting one or more responses once a determination of an occurrence of a potentially malicious activity occurs. For example, the user may configure the sentinel node to provide an alarm to a particular user device if the sentinel node determines that a potentially malicious act has occurred. In another example, the user may configure the sentinel node to terminate a particular network connection if the sentinel node determines that a potentially malicious act has occurred.

By enabling sentinel nodes to be configured or customized, different users may configure different sentinels based on unique situations. For example, a user may be interested in determining whether a document is being modified, and another user may be interested in determining whether a user is providing secure information to an unauthorized party. The customizable sentinels provide different solutions to different users based on the users' specific needs.

Illustrative System

FIG. 1 is a block diagram of a system 100 configured to generate alert data based on parsed data including attribute data. The system 100 includes a sentinel node 102, a user device 104, and emitter nodes 106(1), . . . 106(X). As used in this disclosure, letters in parenthesis such as "(X)" indicate an integer value. The sentinel node 102 is communicatively connected to the user device 104 and the emitter nodes 106 using one or more networks. The sentinel node 102, the user device 104, and the emitter nodes 106 may comprise one or more computing devices. The computing device may have one or more hardware processors and one or more memory devices which may perform the one or more of functions described in this disclosure. These functions may be executed as one or more services. One or more different computing devices may be configured to implement the computing nodes discussed herein. For example, a first computing device may implement the sentinel node 102, a second computing device may implement the user device 104, and a third computing device may implement the emitter nodes 106. In another example, a first plurality of computing devices may implement the sentinel node 102, and different computing devices may implement the user device 104 and the emitter node 106. The system 100 may include more than one sentinel node 102 (not shown) which may not be similar in construction, components, modules, and so forth when compared to the sentinel node 102 illustrated in FIG. 1. For example, the sentinel nodes 102 may include different modules configured to perform different computational tasks. In some implementations, the sentinel node 102 may be described as a server computing device. In FIG. 1, the sentinel node 102 is separate from the emitter nodes 106. In some implementations the sentinel node 102 includes one or more emitter nodes 106.

The network facilitating communication between the sentinel node 102 and the user device 104 and emitter node 106 may include a variety of networks, such as a local network, a wide area network ("WAN"), broadcast network, a personal area network, a wired and wireless local area network ("LAN"), and so forth. In some implementations, the network includes at least one of Ethernet, Wi-Fi™ as promulgated by the Wi-Fi Alliance, 3G and 4G, Bluetooth® as promulgated by the Bluetooth Special Interest Group, and so forth. In some implementations, the devices and systems described herein are configured to directly connect to each other. The system 100 may include additional servers which communicate with the sentinel node 102, the user device 104, and the emitter node 106.

In this implementation, the user device 104 includes an interface module 108, a configuration generation module 110, and a presentation module 112. The interface module 108 may be configured to provide a user interface to a user (e.g., an internal business user) using input/output devices and to accept inputs received from the input/output devices. The user interface may include one or more visual, audible, or haptic elements. For example, the user interface may be configured to provide a graphic user interface, an audible user interface, and so forth. Based on the inputs received, the configuration generation module 110 may generate configuration data 114. The configuration data 114 may comprise information used to configure at least one of the sentinel node 102 and the emitter nodes 106. The configuration data 114 may comprise various different data used to configure various modules or components of at least one of the sentinel node 102 or the emitter nodes 106. As discussed in more detail below, the configuration data 114 may comprise at least one of emitter configuration data 116, sensor configuration data 118, filter configuration data 120, or reaction configuration data 122. As discussed in more detail below, in some implementations, the sentinel node 102 may provide an application programming interface (not shown) which is configured to receive inputs to generate the configuration data 114.

The sentinel node 102 may include an emitter configuration module 124 configured to provide the emitter configuration data 116 to the emitter nodes 106. The emitter configuration data 116 may comprise information causing the emitter nodes 106 to provide event data 126 to the sentinel node 102. The event data 126 may comprise recorded information about activities associated with the emitter nodes 106. For example, the recorded information may indicate information was accessed, transferred, modified, deleted, and so forth. The event data 126 may also include information indicating that a particular user or a particular computing device performed an action. For example, the event data 126 may indicate that a certain document was deleted by a user logged into a particular computing device.

The emitter nodes 106 may include event modules 128 configured to generate and provide the event data 126 to the sentinel node 102. For example, in FIG. 1, the emitter node 106(1) includes the event module 128(1) configured to provide the event data 126(1) to the sentinel node 102. The emitter node 106(X) includes the event module 128(Y) configured to provide the event data 126(Z) to the sentinel node 102.

The sentinel node 102 may include a sensor module 130 configured to generate parsed data 132 using the event data 126 as an input. The parsed data 132 may comprise transformed, normalized or otherwise processed event data 126. The transformation of the event data 126 may include at least one of removing information from the event data 126, adding information to the event data 126, or mapping portions of the event data 126 to designated fields. By transforming the event data 126 into the parsed data 132, the sentinel node 102 may consume large volumes of different types of event data 126 in near real time. The parsed data 132 may represent various information about activities associated with one or more emitter nodes 106. For example, the parsed data 132 may include information indicating the user or computing device that performed a particular action, data describing the action which has been performed, and data indicating the entity that the action was performed on.

The parsed data 132 may include attribute data 134. The attribute data 134 may comprise information about activities associated with one or more emitter nodes 106. For example, the attribute data 134 may comprise information identifying the time in which a particular action took place, information identifying the protocol used to perform a particular network connection, and so forth. The sensor module 130 may generate the attribute data 134 based on the event data 126. Generating the attribute data 134 based on the event data 126 may be described as enriching the event data 126. In one example, the event data 126 includes an Internet Protocol ("IP") address associated with a particular computing device. The sensor module 130 may generate attribute data 134 comprising a hostname associated with the particular computing device using the IP address.

The process of adding the attribute data 134 using the event data 126 may be described as an enrichment process. The sentinel node 102 may include an enrichment module 142 configured to perform the enrichment process. The enrichment node 142 may enable the user to configure the sentinel node 102 to perform one or more enrichment processes at different stages. For example, at a first stage, the enrichment module 142 may perform a first enrichment process, providing first enriched data. Thereafter, at a second stage, the enrichment module 142 may perform a second enrichment process on the first enriched data, resulting in second enriched data. The filter module 136 may be configured to analyze the second enriched data, and may generate alert data 138 based on the analysis.

The enrichment process may include defining a derivation configured to provide an attribute which may be derived from the event data 126 or other already derived attributes. Defining the derivation may include selecting an algorithm or function for analyzing one or more attributes. The function may include, for example, converting the IP address to a fully qualified domain name ("FQDN"). Defining the derivation may include selecting one or inputs from other already derived attributes. Defining the derivation may also include selecting a unique name for the new derived attribute.

The sensor module 130 may generate the parsed data 132 using the sensor configuration data 118 as an input. The sensor configuration data 118 may comprise information which causes the sensor module 130 to select which data to use as inputs for generating the parsed data 132. By selecting certain data for analysis, the sensor module 130 may generate the attribute data 134, which may result in a more efficient process. The data that may be selected for input may comprise a selectable attribute. In one example, the selectable attributes may include actor data and action data. The actor data may indicate a user or a computing device which performed a particular action (e.g., modifying, deleting, and so forth), and the action data may describe the action that was performed by the actor. The sensor configuration data 118 may comprise information which causes the sensor module 130 to analyze the actor data and the action data, and to discard other data.

The sentinel node 102 may include the filter module 136 configured to generate alert data 138 by analyzing the parsed data 132. The alert data 138 may comprise information indicating an occurrence of a malicious or potentially malicious activity. In one example, the filter module 136 is configured to generate the alert data 138 in response to the filter module 136 determining that a particular user accessed an unauthorized computing device.

The filter module 136 may generate the alert data 138 using the filter configuration data 120 as an input. The filter configuration data 120 may comprise information about selecting an algorithm used by the filter module 136 to analyze the parsed data 132. The algorithm may comprise a logical arithmetical or computational process. In one example, the filter module 136 applies the selected algorithm to the parsed data 132 and determines that a user has accessed an unauthorized computing device, indicating a potentially malicious act.

In some implementations, the filter module 136 is configured to select which data to use as inputs. The data that may be selected for input may comprise a selectable attribute. By selecting certain data for analysis, the filter module 136 may ignore irrelevant data, resulting in a more efficient process.

In some implementations, more than one filter module 136 may be chained together. For example, a first filter module 136 may be configured to remove information from first parsed data 132, providing filtered data (not shown). A second filter module 136 may be configured to apply a selected algorithm to the filtered data, to determine whether a potentially malicious activity has occurred. Such a configuration may be visualized as a hierarchical construction which may increase the efficiency of the sentinel node 102. Efficiency may be increased because different filter modules 136 that would perform most of the same or similar processing of event data 126 to generate the parsed data 132 may not need to perform the same processing multiple times. That is, the root of the hierarchy is processed once for all leaf nodes, and each level below the root is processed once, as needed for the leaf node. In complex cases, such a configuration may reduce a large amount of processing time.

The sentinel node 102 may include a reaction module 140 configured to generate reaction data 142. The reaction data 142 may comprise information about one or more responses to the occurrence of the malicious or potentially malicious activity. In one example, the response includes providing a notification to a selected computing device, indicating the occurrence of the potentially malicious activity. In FIG. 1, the reaction module 140 generates the reaction data 142, and provides the reaction data 142 to the user device 104. Once the user device 104 receives the reaction data 142, the presentation module 112 may be configured to provide the reaction data 142 to the user of the user device 104. For example, the presentation module 112 may include an output device (e.g., a display device) configured to display the notification of the occurrence of the malicious or potentially malicious activity.

By enabling internal business users to configure one or more portions of the sentinel node 102, the sentinel node 102 may increase the identification of malicious or potentially malicious activities, thus increasing the security of information. The flexibility to configure the one or more portions of the sentinel node 102 allows particular internal business users to customize how the sentinel node 102 determines what should be considered a malicious or potentially malicious activity.

Figure 2:
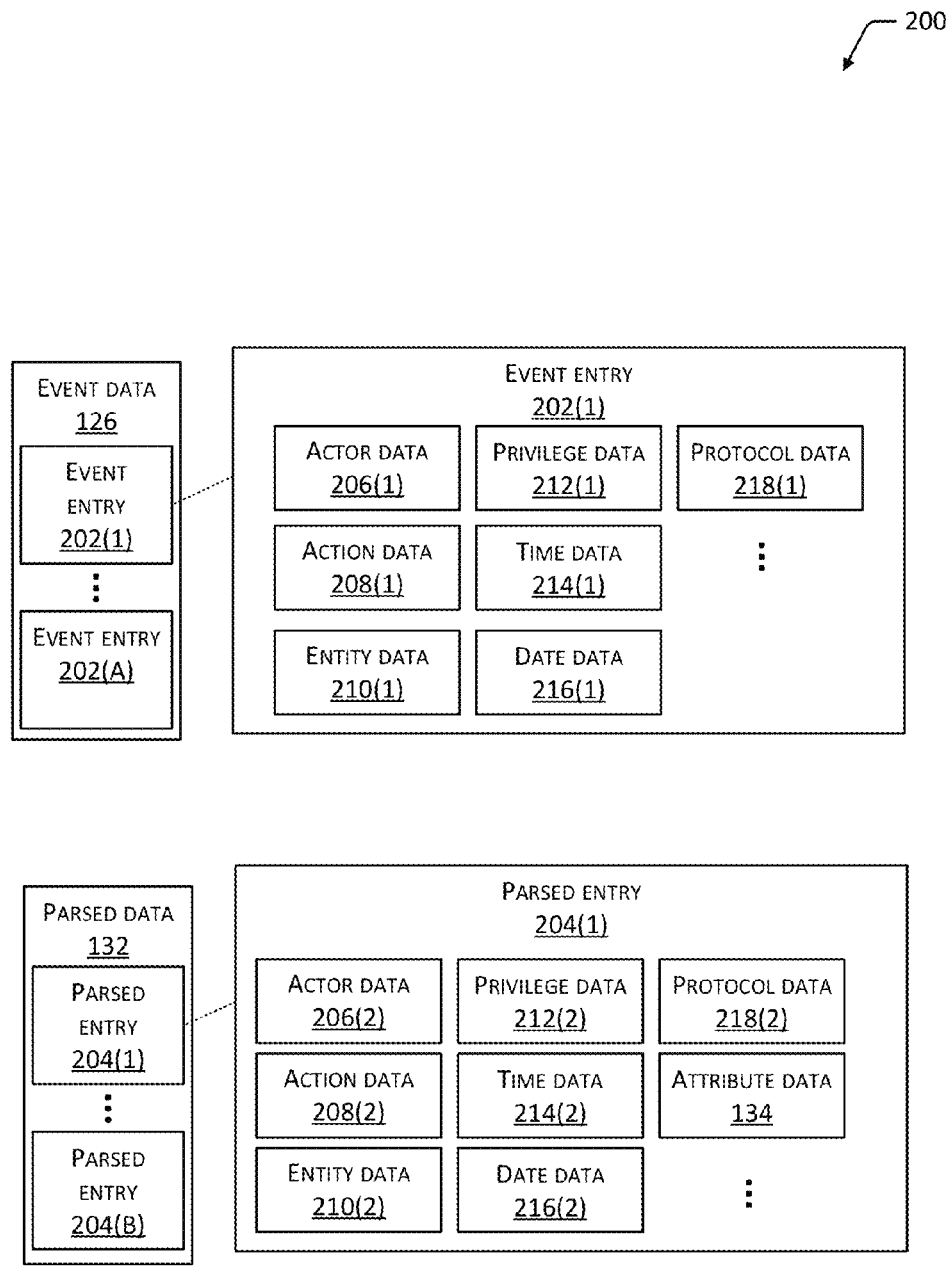
FIG. 2 illustrates examples of the configuration data, the event data, and the parsed data.

FIG. 2 illustrates examples of the event data 126 and the parsed data 132. The event data 126 may comprise a plurality of event entries 202, and the parsed data 132 may comprise a plurality of parsed entries 204. In FIG. 2, the event data 126 comprises event entries 202(1), . . . , 202(A), and the parsed data 132 comprises parsed entries 204(1), . . . , 204(B). The event entry 202(1) may comprise one or more of the following data: actor data 206(1); action data 208(1); entity data 210(1); privilege data 212(1); time data 214(1); date data 216(1); and protocol data 218(1).

The actor data 206(1) may comprise information about a user or a computing device. In one example, the actor data 206(1) includes data representing a unique identifier associated with a user of a computing device. The unique identifier may represent a user which caused a computing device to perform an action, such as accessing particular information, modifying particular information, connecting to a particular computing device, and so forth. In another example, the actor data 206(1) comprises at least one of data representing a unique identifier associated with computing device, data identifying a computing device that performed a particular action, or data representing an IP address of the computing device.

The action data 208(1) may comprise information about a particular action that was performed by at least one of a user or a computing device. For example, the action data 208(1) may include at least one of data indicating access to information or a computing device, data indicating information was transferred to an unauthorized computing device, and so forth.

The entity data 210(1) may comprise information about an entity that a computing device is performing an action on. For example, the entity data 210(1) may identify a particular document that was modified, or a particular computing device that was accessed. The privilege data 212(1) may comprise information about events related to a modification of privileges. For example, the privilege data 212(1) may indicate that a user was granted access to a particular document.

The time data 214(1) may comprise information about time. The time data 214(1) may represent when an action occurred, when a particular event data 126 was generated, and so forth. The date data 216(1) may comprise information about a date. The date data 216(1) may represent the date that an action was performed. The protocol data 218(1) may comprise data about a transmission protocol which was used by a particular computing device to perform an action.

The parsed data 132 may be described as transformed or otherwise processed event data 126. The parsed data 132 may include a plurality of parsed entries 204(1), . . . , 204(B). As illustrated in FIG. 2, the parsed entry 204(1) may comprise one or more of the following data: the actor data 206(2); the action data 208(2); the entity data 210(2); the privilege data 212(2); the time data 214(2); the date data 216(2); the protocol data 218(2); and attribute data 134.

The attribute data 134 may comprise information about activities associated with one or more emitter nodes 106. In some implementations, the sentinel node 102 generates the attribute data 134 based on the event data 126. For example, the event data 126 may include information representing an Internet Protocol ("IP") address. The sentinel node 102 may generate attribute data 134 comprising a hostname using the IP address. This information representing the hostname may be added to the parsed data 132 as the attribute data 134. In another implementation, the attribute data 134 may comprise at least one of the actor data 206(2); the action data 208(2); the entity data 210(2); the privilege data 212(2); the time data 214(2); the date data 216(2); and the protocol data 218(2).

Figure 3:
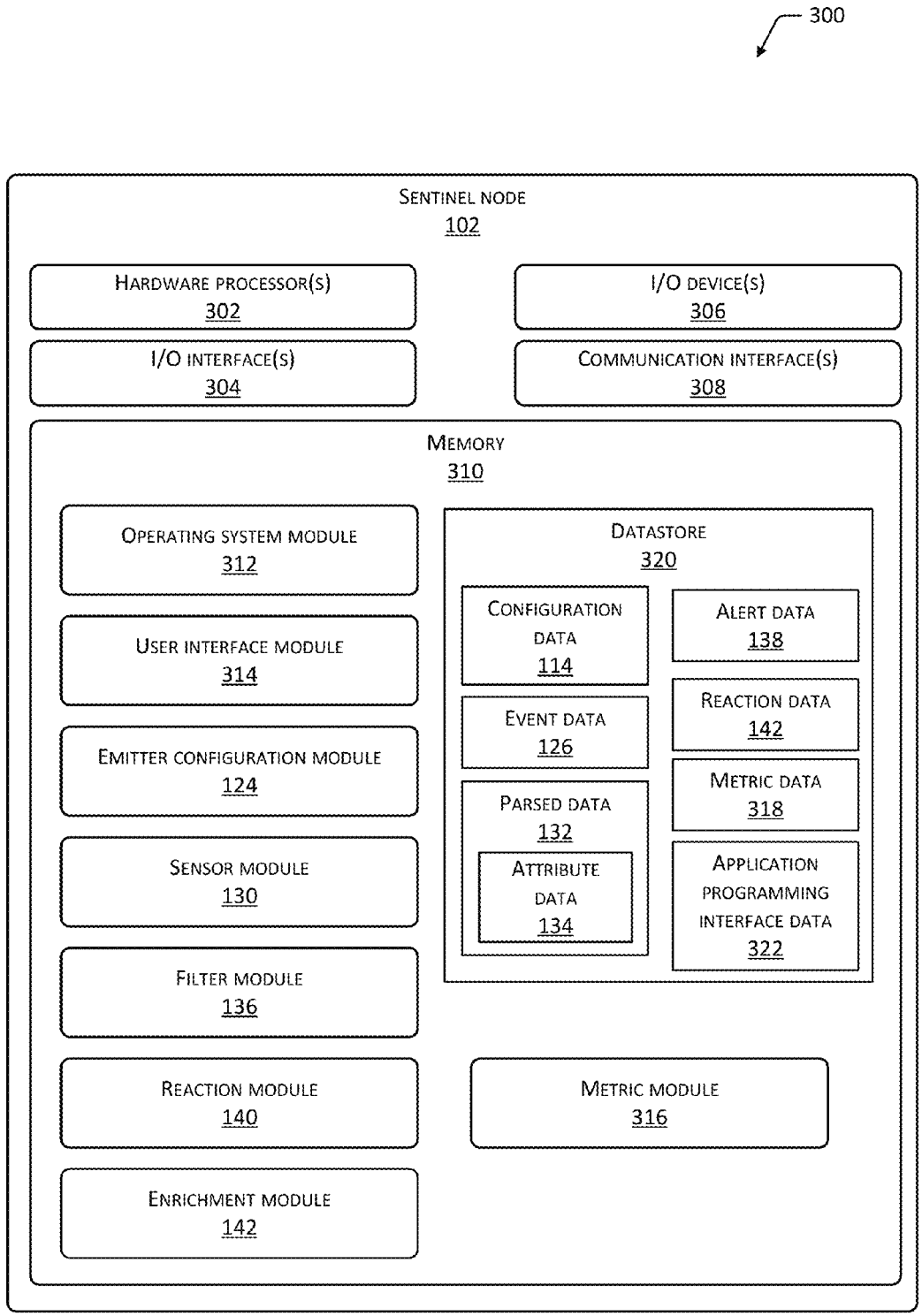
FIG. 3 is a block diagram of the sentinel node configured to identify malicious or potentially malicious activity.

FIG. 3 is a block diagram 300 of the sentinel node 102 configured to identify malicious or potentially malicious activity. The sentinel node 102 may include at least one hardware processor 302 configured to execute stored instructions. The at least one hardware processor 302 (or "processor") may comprise one or more cores.

The sentinel node 102 includes at least one input/output ("I/O") interface 304 which enables portions of the sentinel node 102 (e.g., the hardware processor 302) to communicate with other devices. The I/O interface 304 may include inter-integrated circuit ("I2C"), serial peripheral interface bus ("SPI"), Universal Serial Bus ("USB"), RS-232, High-Definition Multimedia Interface ("HDMI"), TOSLINK, Bluetooth, and so forth. The at least one I/O interface 304 may be operatively connected to at least one I/O device 306. In some implementations, certain I/O devices 306 are physically incorporated with the sentinel node 102 or externally placed.

The at least one I/O device 306 may include one or more input devices such as a button or a microphone. The I/O device 306 may include one or more of a variety of output devices such as one or more displays or speakers.

The sentinel node 102 may include at least one communication interface 308. The communication interface 308 may be configured to provide communications between the sentinel node 102 and other devices, such as the user device 104, routers, access points, servers, other sentinel nodes 102, the one or more emitter nodes 106, and so forth. The communication interface 308 may connect to the network.

The sentinel node 102 may include at least one bus or other internal communications hardware or software that enables for the transfer of data between the various modules and components of the sentinel node 102.

As illustrated in FIG. 3, the sentinel node 102 may include at least one memory or memory device 310. The memory 310 may include at least one non-transitory computer-readable storage media ("CRSM"). The CRSM may include at least one of an electronic storage medium, a magnetic storage medium, an optical storage medium, a quantum storage medium, or a mechanical computer storage medium. The memory 310 may include computer readable instructions, data structures, program modules and other data for the operation of the sentinel node 102.

The memory 310 may include at least one operating system ("OS") module 312. The OS module 312 may be configured to manage hardware resources such the I/O interface 304, the I/O devices 306, the communication interface 308, and provide various services to applications or modules executing on the hardware processor 302. The memory 310 may also store at least one of the following modules which may be executed as foreground applications, background tasks, daemons, and so forth.

In some implementations, a user interface module 314 is configured to provide a user interface to the user using the I/O devices 306 and to accept inputs received from the I/O devices 306. The user interface may include one or more visual, audible, or haptic elements. For example, the user interface may be configured to provide a graphic user interface, an audible user interface, and so forth.

The memory 310 may include the emitter configuration module 124 configured to provide the emitter configuration data 116 to one or more emitter nodes 106. The memory 310 may include the sensor module 130 configured to generate the parsed data 132. The sensor module 130 may generate the parsed data 132 by transforming the event data 126. The transformation of the event data 126 may include at least one of removing information from the event data 126, adding information to the event data 126, or mapping portions of the event data 126 to designated fields. By transforming the event data 126 into the parsed data 132, the sentinel node 102 may consume large volumes of different types of event data 126 in near real time. The sensor module 130 may generate the parsed data 132 using the sensor configuration data 118 as an input.

The memory 310 may include the filter module 136 configured to generate the alert data 138. The filter module 136 may generate the alert data 138 based on an analysis of the parsed data 132. In one example, the filter module 136 generates the alert data 138 in response to the filter module 136 determining that a particular user accessed an unauthorized computing device. The filter module 136 may generate the alert data 138 using the filter configuration data 120 as an input. In one example, the filter module 136 applies a selected algorithm to the parsed data 132 and determines that a user has accessed an unauthorized computing device, indicating a potentially malicious act.

The memory 310 may include the reaction module 140 configured to generate the reaction data 142. The reaction module 140 may generate the reaction data 142 using the alert data 138 as an input.

The memory 310 may include the enrichment module 142 configured to perform the enrichment process. The enrichment process may include defining a derivation configured to provide an attribute which may be derived from the event data 126 or other already derived attributes. Defining the derivation may include selecting an algorithm or function for analyzing one or more attributes. The function may include, for example, converting the IP address to a FQDN. Defining the derivation may also include selecting one or inputs from other already derived attributes. Defining the derivation may also include selecting a unique name for the new derived attribute.

The memory 310 may include a metric module 316 configured to determine an amount of resources that is or would be consumed by performing at least the generation of at least one of the event data 126, the alert data 138, or the reaction data 142. The resources consumed may include memory, processor, data transfer, and so forth. The amount of resources consumed may comprise metric data 318. In response to a determination that the amount of the resources consumed exceeds a designated amount, the metric module 316 causes at least one computing device to operate in cooperation with the sentinel node 102 to perform at least one of the generation of the at least one of the event data 126, the alert data 138, or the reaction data 142.

Different configuration data 114 may cause the sentinel nodes 102 to consume different amounts of resources. For example, first configuration data 114 may cause the sentinel node 102 to analyze event data 126 from one emitter node 106, and second configuration data 114 may cause the sentinel node 102 to analyze event data 126 from one hundred different emitter nodes 106. The analysis of the event data 126 from the one hundred emitter nodes 106 may cause the sentinel node 102 to consume more resources when compared to the analysis of the event data 126 from the one emitter node 106.

In some implementations, the memory 310 includes a datastore 320 for storing information. The datastore 320 may use a flat file, database, linked list, tree or other data structure to store the information. In some implementations, the datastore 320, or a portion thereof, may be distributed across at least one other device, such as a server, a network storage device, and so forth. As illustrated in FIG. 3, the datastore 320 may include at least one of the configuration data 114, the event data 126, the parsed data 132, the alert data 138, the reaction data 142, the metric data 318, or the application programming interface data 322.

The configuration data 114 comprises information used to configure at least one portion of the sentinel node 102 or the emitter node 106. The sentinel node 102 may enable the internal business user to continuously change or modify the configuration data 114. The configuration data 114 may comprise at least one of the emitter configuration data 116, the sensor configuration data 118, the filter configuration data 120, or the reaction configuration data 122. The emitter configuration data 116 may comprise information causing one or more emitter nodes 106 to provide the event data 126 to the sentinel node 102. The sensor configuration data 118 may comprise information which causes the sensor module 130 to transform the event data 126 into the parsed data 132. The filter configuration data 120 may comprise information about selecting an algorithm used by the filter module 136 to analyze the parsed data 132. The algorithm may comprise a logical arithmetical or computational process.

The event data 126 may comprise recorded information about activities associated with the emitter nodes 106. The recorded information may indicate information was accessed, transferred, modified, deleted, and so forth. The event data 126 may also include information indicating that a particular user or a particular computing device performed an action. For example, the event data 126 may indicate that a certain document was deleted by a user logged onto a particular computing device.

The parsed data 132 may comprise transformed, normalized or otherwise processed event data 126. The parsed data 132 may represent various information about activities associated with one or more emitter nodes 106. For example, the parsed data 132 may include information indicating the user or computing device that performed a particular action, data describing the action which has been performed, and data indicating the entity that the action was performed on. The attribute data 134 may comprise information about activities associated with one or more emitter nodes 106. For example, the attribute data 134 may comprise information identifying the time in which a particular action took place, information identifying the protocol used to perform a particular network connection, and so forth. The sensor module 130 may generate the attribute data 134 based on the event data 126. In one example, the event data 126 includes an Internet Protocol ("IP") address associated with a particular computing device. The sensor module 130 may generate attribute data 134 comprising a hostname associated with the particular computing device using the IP address.

The alert data 138 may comprise information indicating an occurrence of a malicious or potentially malicious activity. The reaction data 142 may comprise information about one or more responses to the occurrence of the malicious or potentially malicious activity.

The metric data 318 may comprise information about an amount of resources consumed by one or more processes performed by at least one of the sentinel node 102 and the emitter node 106. The resources consumed may include memory, processor, data transfer, and so forth.

The application programming interface data 322 may comprise information used by the sentinel node 102 to provide an application programming interface. The application programming interface may be configured to provide a common set of service calls which may be used by one or more services executing on one or more nodes. The application programming interface may be implemented as one or more libraries including routines, data structures, object classes, variables, and so forth associated with operation of the system described herein.

Figure 4:
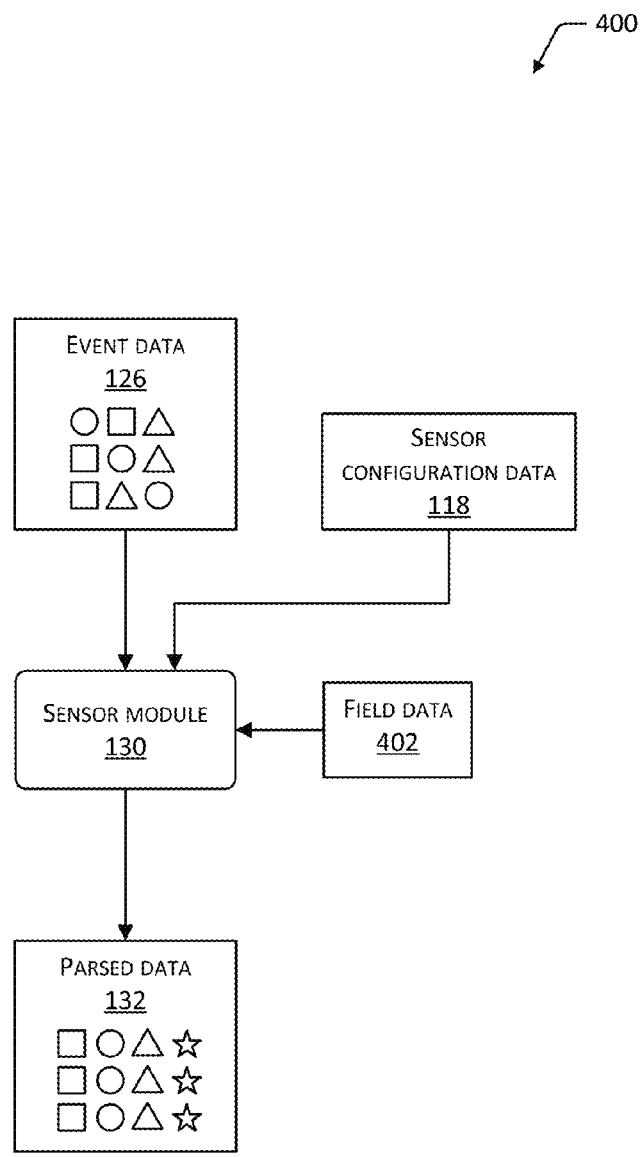
FIG. 4 is a block diagram of a sensor module generating parsed data based on event data, sensor configuration data, and field data.

FIG. 4 is a block diagram 400 of the sensor module 130 generating the parsed data 132 using the event data 126, the sensor configuration data 118, and field data 402 as inputs. The event data 126 includes a plurality of event entries 202 illustrated as different shapes. The different shapes include three circle event entries 202, three square event entries 202, and three triangle event entries 202. In one example, the circles may represent the actor data 206(1), the squares may represent the action data 208(1), and the triangles may represent the entity data 210(1).

The sensor configuration data 118 comprises information which causes the sensor module 130 to transform, normalize, or otherwise process the event data 126. For example, in FIG. 4, the sensor module 130 reorders the shapes shown in the event data 126, and adds parsed entries 204 which are illustrated as star shapes. The star shaped entries may represent the attribute data 134.

The field data 402 may comprise information about assigning the event entries 202 to the designated fields. Using the field data 402, the sensor module 130 assigns the event entries 202 to the designated fields. The transformation of the event data 126 into the parsed data 132 may include the assignment of the event entries 202 to the designated fields.

Figure 5:
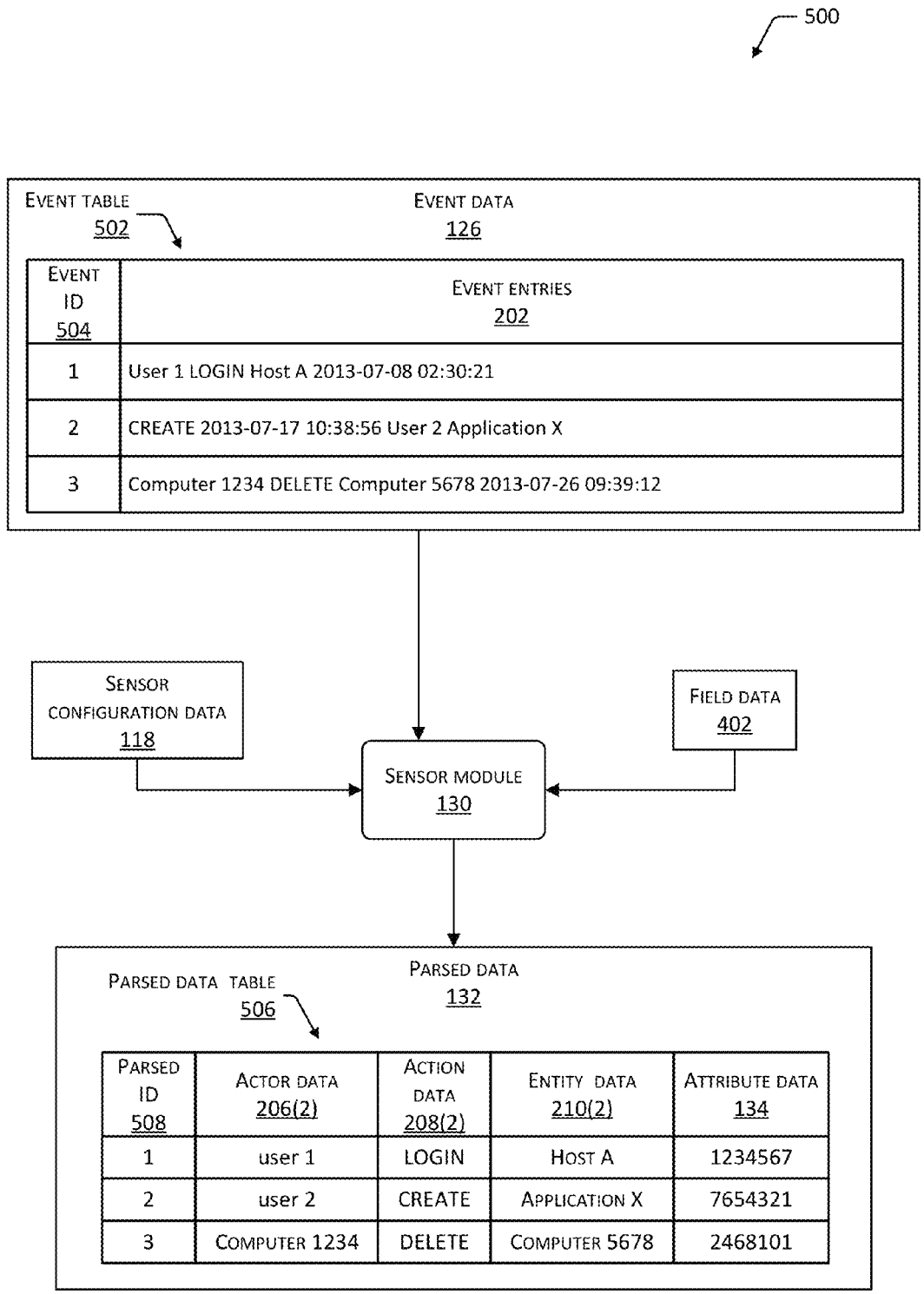
FIG. 5 is a block diagram of the sensor module generating the parsed data, illustrating the parsed data including actor data, action data, entity data, and attribute data.

FIG. 5 is a block diagram 500 of the sensor module 130 generating the parsed data 132, illustrating the parsed data 132 including the actor data 206(2), the action data 208(2), the entity data 210(2), and the attribute data 134. The event data 126 includes an event table 502 which includes data characterized as being organized in columns and rows. The rows of the event table 502 represent events associated with event IDs 504.

The events include the event entries 202. The event associated with event ID 504 "1" comprises the following five event entries 202: 1) "User 1"; 2) "LOGIN"; 3) "Host A"; 4) "2013-07-08"; and 5) "02:30:21". The event associated with event ID 504 "2" comprises the following five event entries 202: 1) "CREATE"; 2) "2013-07-17"; 3) "10:38:56"; 4) "User 2"; and 5) "Application X". The event associated with event ID 504 "3" comprises the following five event entries 202: 1) "Computer 1234"; 2) "DELETE"; 3) "Computer 5678"; 4) "2013-07-26"; and 5) "09:39:12".

In FIG. 5, the sensor module 130 generates the parsed data 132. The parsed data 132 include a parsed data table 506 which includes data characterized as being organized in columns and rows. The parsed data table 506 includes the following five fields: parsed ID 508; the actor data 206(2); the action data 208(2); the entity data 210(2); and the attribute data 134. In FIG. 5, the sensor module 130 reorganizes the event data 126. For example, as shown in FIG. 5, when viewed from left to right, the data of the parsed data table 506 has a different order than the data of the event data table 502.

The parsed data 132 associated with parsed ID 508 "1" comprises the following four parsed entries 204: 1) "user 1"; 2) "LOGIN"; 3) "Host A"; 4) "1234567". The parsed data 132 associated with parsed ID 508 "2" comprises the following four parsed entries 204: 1) "user 2"; 2) "CREATE"; 3) "Application X"; 4) "7654321". The parsed data 132 associated with parsed ID 508 "3" comprises the following four parsed entries 204: 1) "Computer 1234"; 2) "DELETE"; 3) "Computer 5678"; 4) "2468101".

The sensor module 130 generates the parsed data 132 using the sensor configuration data 118 as an input. The sensor configuration data 118 may comprise information which causes the sensor module 130 to add information. More specifically, the sensor module 130 may add the attribute data 134. In FIG. 5, the attribute data 134 may represent a unique identification number such as an IP address. The sensor module 130 may generate the attribute data 134 using the event data 126.

In FIG. 5, the sensor module 130 generates the parsed data 132 by mapping the event entries 202 to the parsed entries 204. For example, the sensor module 130 maps the event entry 202 "User 1" to the parsed entry 204(2) "user 1", the event entry 202 "LOGIN" to the parsed entry 204(2), and so forth. Using the field data 402, the sensor module 130 assigns the event entries 202 to designated fields as shown in the parsed data table 506.

Figure 6:
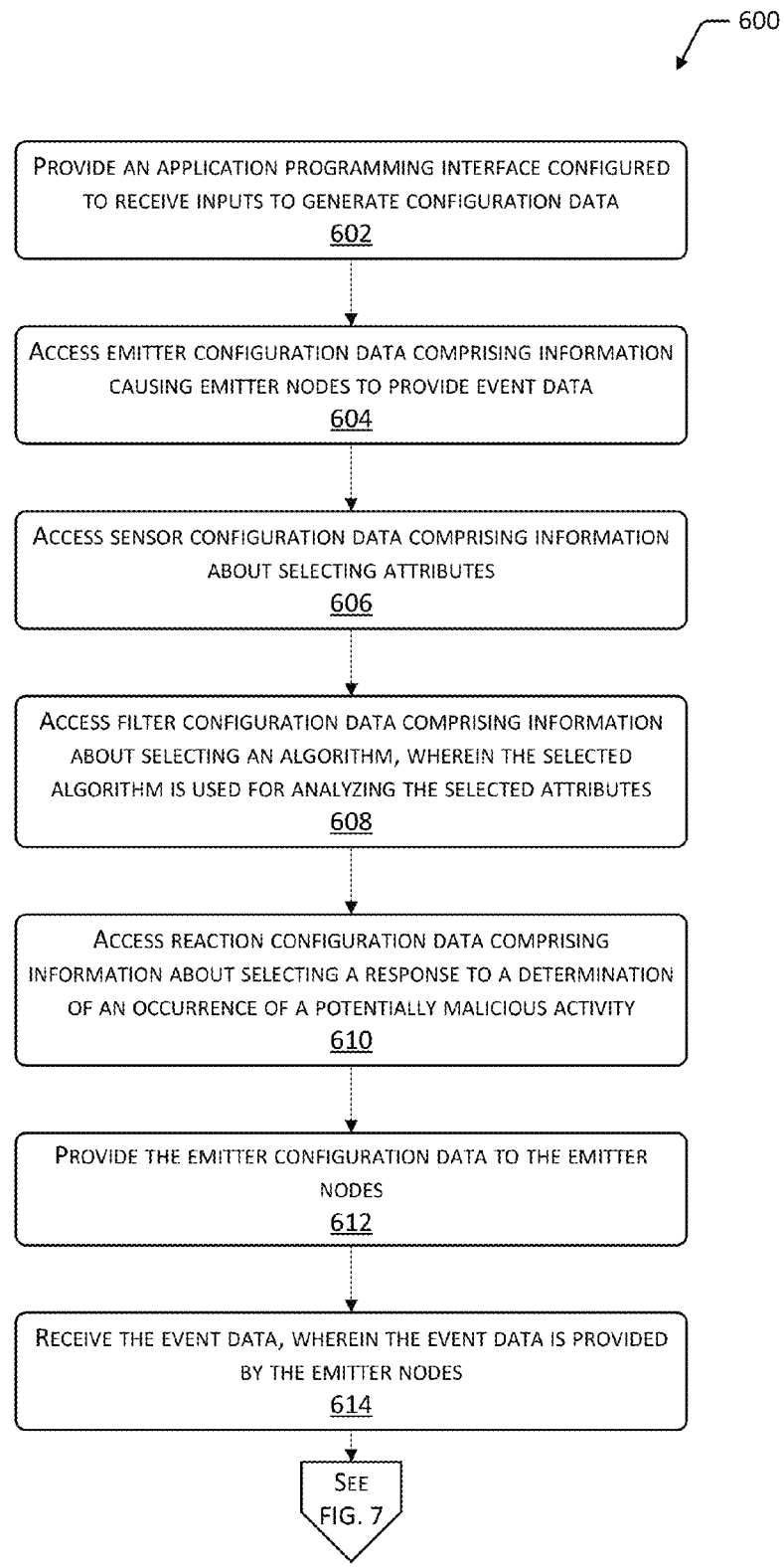
FIGS. 6 and 7 depict a flow diagram illustrating the process of determining the occurrence of malicious or potentially malicious event based on accessing the configuration data.
Figure 7:
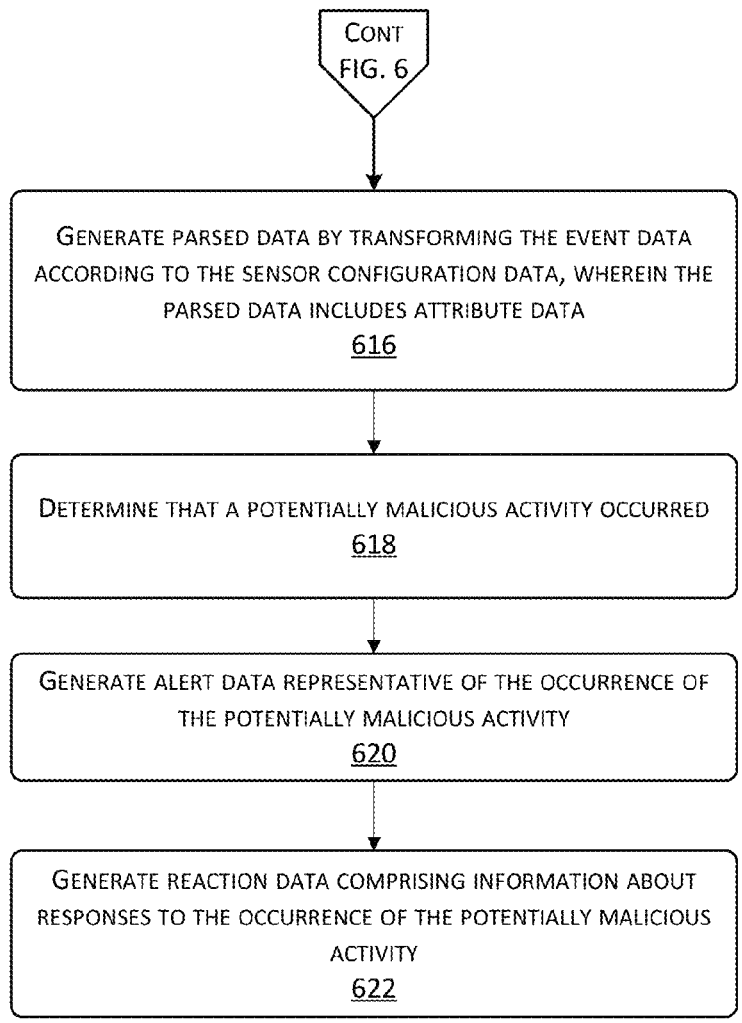

FIGS. 6 and 7 depict a flow diagram 600 illustrating a process of determining the occurrence of malicious or potentially malicious event based on accessing the configuration data 114. The sentinel node 102 may implement the process 600. Although the process 600 is described with reference to the flowchart illustrated in FIGS. 6 and 7, many other methods performing the acts associated with the process 600 may be used. For example, the order of many of the steps may be changed, some of the steps described may be optional, and additional steps may be included.

At 602, the sentinel node 102 provides the application programming interface configured to receive inputs to generate the configuration data 114. The configuration data 114 may comprise various data used to configure various components of the sentinel node 102. In this implementation, the configuration data 114 includes the emitter configuration data 116, the sensor configuration data 118, the filter configuration data 120, and the reaction configuration data 122. The user device 104 may provide the configuration data 114 to the sentinel node 102.

At 604, the sentinel node 102 accesses the emitter configuration data 116 comprising information causing the emitter nodes 106 to provide the event data 126. Once the sentinel node 102 receives the emitter configuration data 116 from the user device 104, the sentinel node 102 may provide the emitter configuration data 116 to one or more identified emitter nodes 106. Once the one or more emitter nodes 106 receive the emitter configuration data 116 from the sentinel node 102, the one or more emitter nodes 106 may provide the event data 126 to the sentinel node 102. For example, once the emitter node 106(1) receives the emitter configuration data 116, the event module 128(1) provides the event data 126(1) to the sentinel node 102. The event data 126 may comprise recorded information about one or more activities. For example, the recorded information may indicate that information has been accessed, information was transferred to a certain computing device, information was modified, and so forth.

At 606, the sentinel node 102 accesses the sensor configuration data 118 comprising information about selecting attributes. The attributes may comprise information about activities associated with one or more emitter nodes 106. For example, the attribute may comprise the actor data 206(1) which comprises information about the user or computing device which performed an action. In one example, the sensor module 130 selects an attribute using the sensor configuration data 118 as an input.

At 608, the sentinel node 102 accesses the filter configuration data 120 comprising information about selecting an algorithm. The sentinel node 102 analyzes the selected attributes using the selected algorithm. The algorithm may comprise a logical arithmetical or computational process. In one example, the sentinel node 102 applies the selected algorithm to the parsed data 132 and determines that a particular user has unsuccessfully attempted to logon to a particular machine twenty times within the last two minutes, indicating a potentially malicious act.

At 610, the sentinel node 102 accesses the reaction configuration data 122 comprising information about selecting a response to a determination of an occurrence of a potentially malicious activity. In one example, the reaction module 140 performs the selected response using the reaction configuration data 122 as an input. The response may include providing a ticket comprising information about the occurrence of the potentially malicious activity.

At 612, the sentinel node 102 provides the emitter configuration data 116 to the emitter nodes 106. In this implementation, the sentinel node 102 provides the emitter configuration data 116 to more than one emitter node 106. In other implementations, the sentinel node 102 provides the emitter configuration data 116 to one emitter node 106.

At 614, the sentinel node 102 receives the event data 126. In this implementation, different emitter nodes 106 provide different event data 126 to the sentinel node 102. In other implementations, one emitter node 106 may provide the event data 126 to sentinel node 102.

At 616, the sentinel node 102 generates the parsed data 132 by transforming the event data 126 according to the sensor configuration data 118. In this implementation, the parsed data 132 includes the attribute data 134. The sensor module 130 may generate the parsed data 132 using the sensor configuration data 118 and the event data 126 as inputs.

At 618, the sentinel node 102 determines that a potentially malicious activity occurred. The potentially malicious activity may include information indicating that certain information has been accessed, a certain user has attempted to connect to a certain computing device, and so forth. At 620, the sentinel node 102 generates the alert data 138 representative of the occurrence of the potentially malicious activity.

At 622, the sentinel node 102 generates the reaction data 142 comprising information about responses to the occurrence of the potentially malicious activity. The responses may include one or more different responses. For example, the response may include at least one of providing an alarm indicating the occurrence of the potentially malicious activity, providing a ticket comprising information about the occurrence of the potentially malicious activity, terminating a communication connection of a computing device associated with the potentially malicious activity, and so forth.

Figure 8:
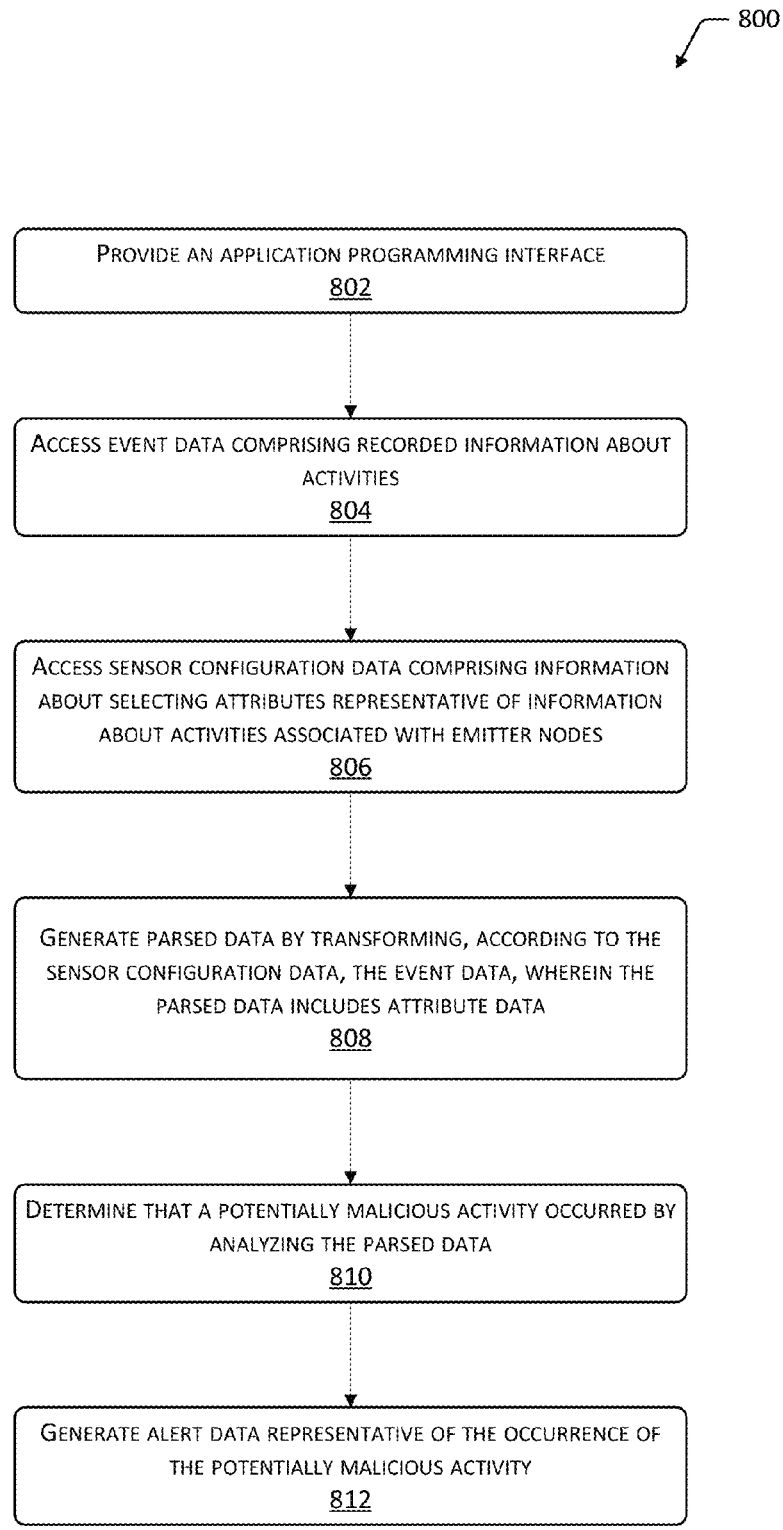
FIG. 8 is a flow diagram illustrating a process of determining an occurrence of a malicious or potentially malicious activity by analyzing the parsed data.

FIG. 8 is a flow diagram 800 illustrating a process of determining an occurrence of a malicious or potentially malicious activity by analyzing the parsed data 132. The sentinel node 102 may implement the process 800. Although the process 800 is described with reference to the flowchart illustrated in FIG. 8, many other methods performing the acts associated with the process 800 may be used. For example, the order of many of the steps may be changed, some of the steps described may be optional, and additional steps may be included.

At 802, the sentinel node 102 provides an application programming interface. At 804, the sentinel node 102 accesses the event data 126 comprising recorded information about activities. One or more emitter nodes 106 may provide the event data 126 to the sentinel node 102. For example, the emitter node 106(1) may provide the event data 126(1) to the sentinel node 102, and the emitter node 106(X) may provide the event data 126(Z) to the sentinel node 102.

The event data 126 may include event entries 202. The event entries 202 may comprise at least one of the actor data 206(1), the action data 208(1), the entity data 210(1), and so forth.

At 806, the sentinel node 102 accesses the sensor configuration data 118 comprising information about selecting attributes representative of information about activities associated with emitter nodes 106. The user device 104 may provide the sensor configuration data 118 once the user device 104 receives inputs from an internal business user.

At 808, the sentinel node 102 generates the parsed data 132 by transforming the event data 126 according to the sensor configuration data 118. The parsed data 132 includes the attribute data 134. In one example, the event data 126 includes event entries 202. The transformation of the event data 126 may include at least one of removing one or more of the event entries 202, or supplementing the event entries 202 with other information such as the attribute data 134. The transformation of the event data 126 may include assigning the event entries 202 to designated fields. The sentinel node 102 may generate the attribute data 134 based on the event entries 202.

At 810, the sentinel node 102 determines that a potentially malicious activity occurred by analyzing the parsed data 132. The potentially malicious activity may comprise a malicious activity. In one example, the filter module 136 analyzes the parsed data 132 and determines that a potentially malicious activity occurs when the filter module 136 determines that user has unsuccessfully attempted to log into a computing device at least thirty times within the last ten minutes. The sentinel node 102 may determine that a potentially malicious activity occurred by applying a selected algorithm. For example, the sentinel node 102 may enable an internal business user to select one of a plurality of different algorithms to be used by the sentinel node 102 when determining whether a malicious or potentially malicious activity has occurred.

The analysis of the parsed data 132 may include determining whether a designated activity has occurred in an amount exceeding a designated number. For example, the designated activity may comprise unsuccessfully logging into a computing device, and the designated number may comprise five. In this example, if the analysis of the parsed data 132 indicates that a user has unsuccessfully attempted to log onto the computing device more than five times, the sentinel node 102 determines that a potentially malicious activity has occurred. In some implementations, the user device 104 provides the designated number to the sentinel node 102 based on inputs received from an internal business user of the user device 104.

At 812, the sentinel node 102 generates the alert data 138 representative of the occurrence of the potentially malicious activity. In one example, the alert data 138 may comprise information indicating that a user has unsuccessfully attempted to log into a computing device at least thirty times within the last ten minutes. The reaction module 140 may generate the reaction data 142 using the alert data 138 as an input. Continuing with the example, in response to the reaction module 140 receiving the alert data 138, the reaction module 140 may generate the reaction data 142 comprising information structured to cause the computing device to lock up, blocking the user from attempting to access the computing device.

Figure 9:
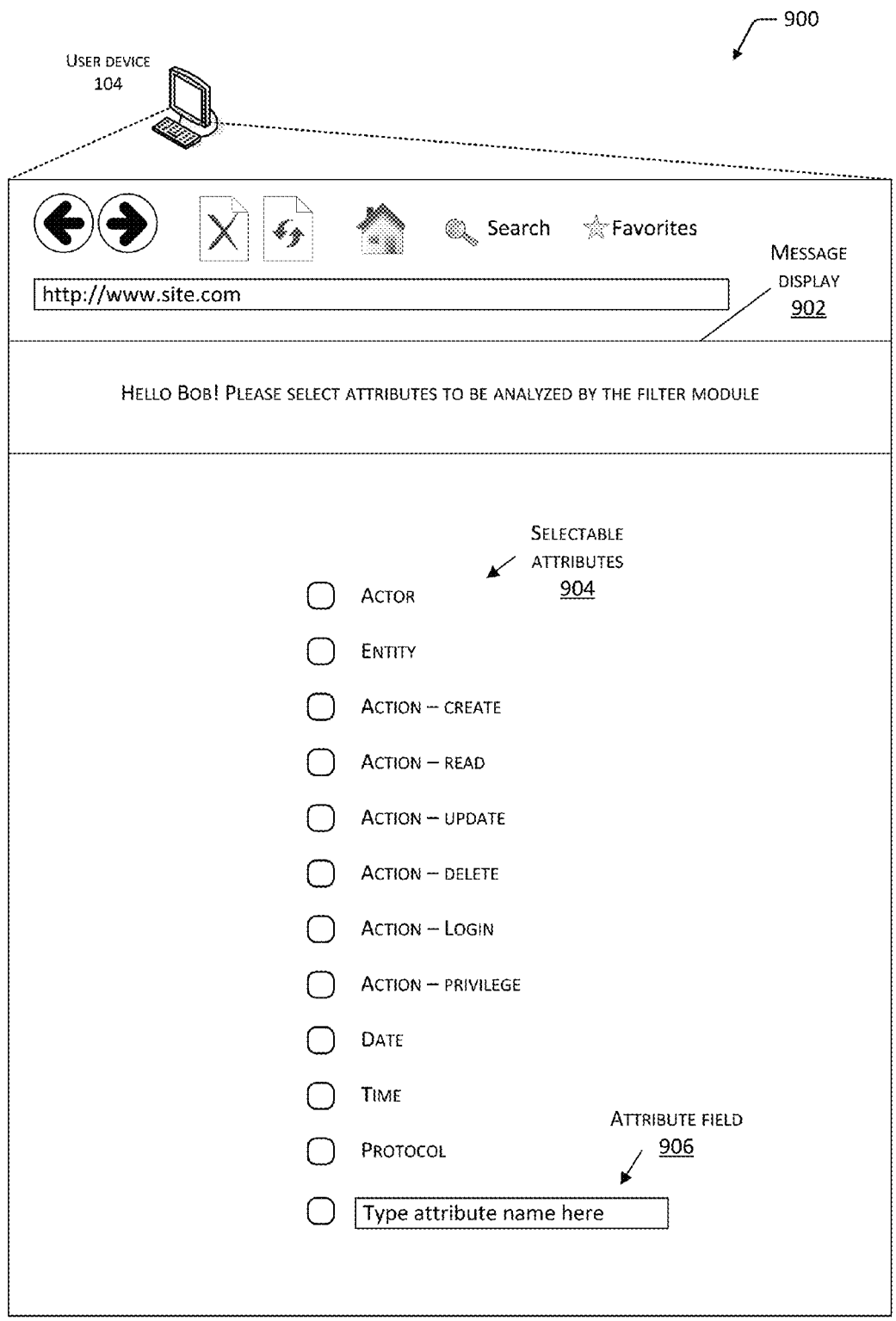
FIG. 9 is a displayed web page illustrating the user device enabling the user to configure attributes used for analysis by the filter module.

FIG. 9 is a displayed web page 900 illustrating the user device 104 enabling the user to configure the sensor module 130 by selecting data to be analyzed by the sensor module 130. The displayed web page 900 is displayed at a point in time where the user has selected no attributes. The user device 104 displays a message display 902 which includes the following message: "Hello Bob! Please select attributes to be analyzed by the filter module."

The user device 104 may display selectable attributes 904. In this example, the selectable attributes 904 includes: "actor"; "entity"; "action-create"; "action-read"; "action-update"; "action-delete"; "action-login"; "action-privilege"; "date"; "time"; and "protocol". The selectable attributes 904 may be selected by the internal business customer operating with the user device 104. By enabling the user to select which attributes to analyze, the sentinel node 102 may analyze more relevant data, resulting in a more efficient process.

The user device 104 displays attribute field 906. The attribute field 906 enables the user to customize and name or label a selectable attribute which may be used for analysis by one or more filter modules 136. For example, the user may input a first label having the name 'IP' and a second label having the name 'region'. One or more filter modules 136 may use the IP selectable attribute or the region selectable attribute as an input.

Figure 10:
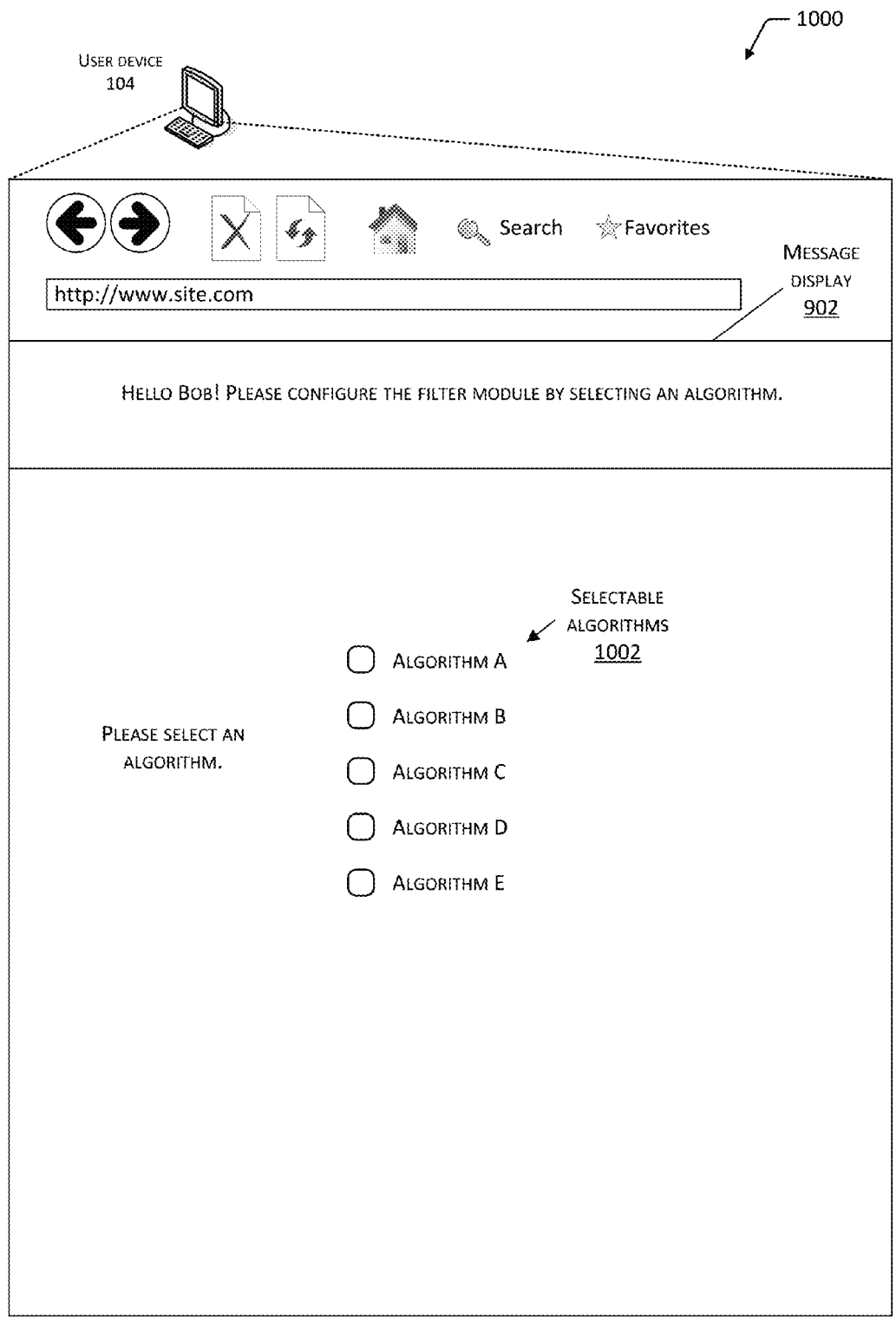
FIG. 10 is a displayed web page illustrating the user device enabling the user to configure the filter module by selecting an algorithm.

FIG. 10 is a displayed web page 1000 illustrating the user device 104 enabling the user to configure the filter module 136 by selecting an algorithm. The displayed web page 1000 is displayed at a point in time before the user makes selections for the algorithm. The user device 104 displays the message display 902 which includes the following message: "Hello Bob! Please configure the filter module by selecting an algorithm."

The user device 104 displays the following five selectable algorithms 1002: "Algorithm A"; "Algorithm B"; "Algorithm C"; "Algorithm D"; and "Algorithm E". The sentinel node 102 may apply the selected algorithm to the selected attributes to determine whether a malicious or potentially malicious activity has occurred.

Figure 11:
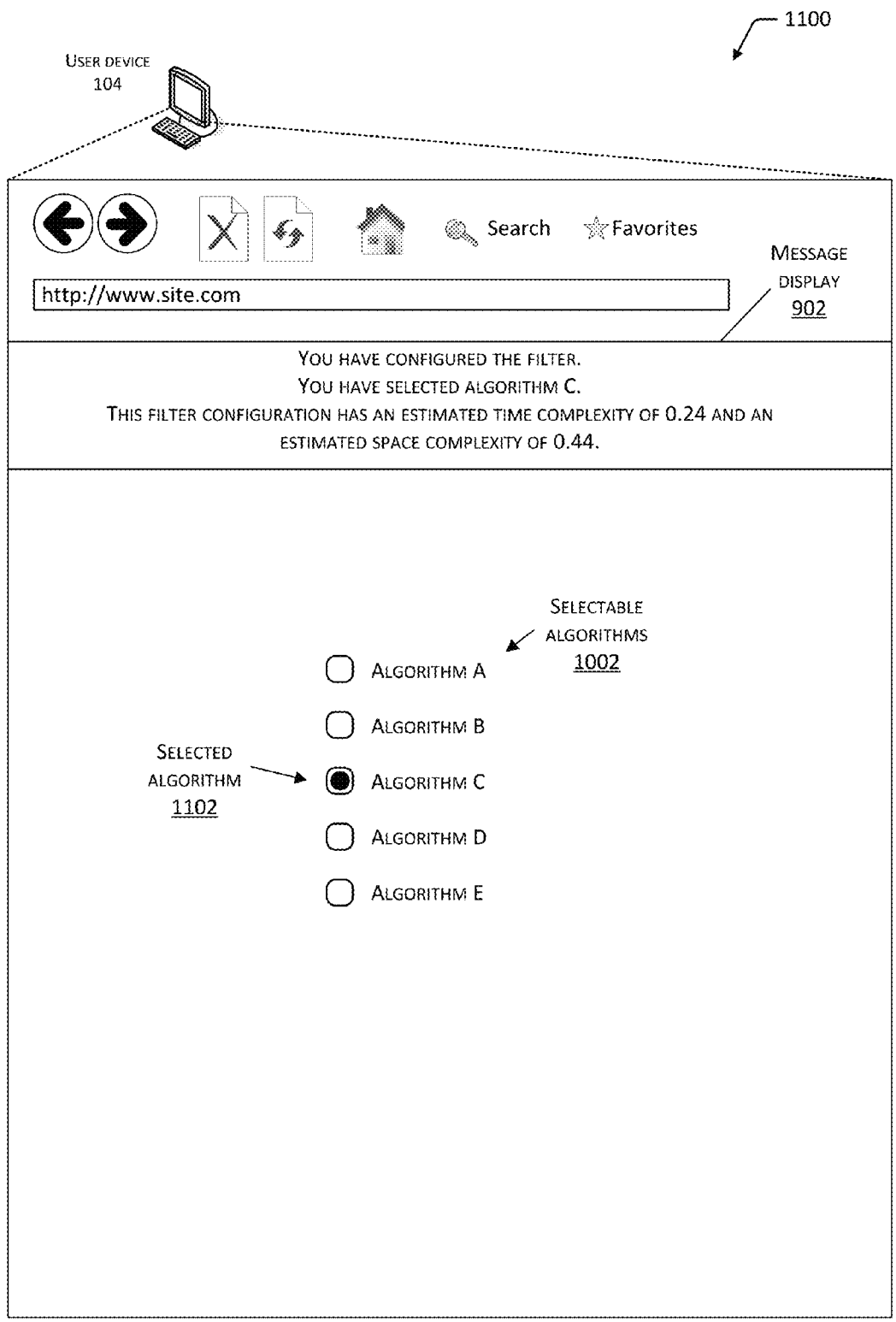
FIG. 11 is a displayed web page illustrating one or more selected algorithms, and complexities associated with the selected algorithms.

FIG. 11 is a displayed web page 1100 illustrating one or more selected algorithms, and the complexities associated with the selected algorithms. The displayed web page 1100 is displayed at a point in time after the user makes the selection of the algorithm. The user device 104 displays the message display 902 which includes the following message: "You have configured the filter. You have selected algorithm C. This filter configuration has an estimated time complexity of 0.24 and an estimated space complexity of 0.44."

The user device 104 displays the five selectable algorithms 1002, and the selected algorithm 1102, which is the algorithm C. The sentinel node 102 is configured to apply the algorithm C to the selected attributes. The estimated time complexity and space complexity may comprise the metric data 318. The time complexity may comprise information indicating an amount of time for the execution of the selected algorithm 1102 to occur. The space complexity may comprise information indicating an amount of memory consumed to execute the selected algorithm 1102.

Figure 12:
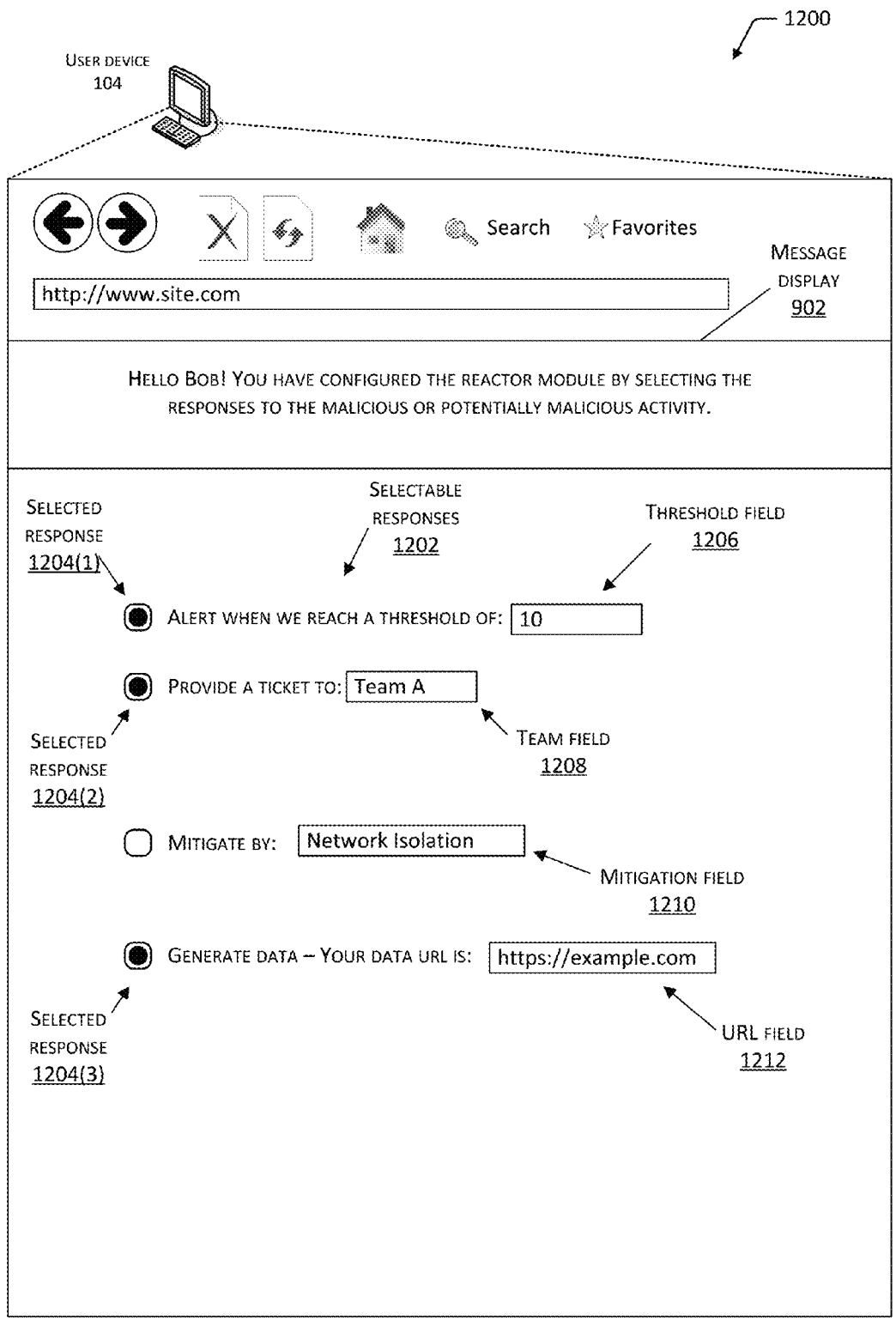
FIG. 12 is a displayed web page illustrating the user device enabling the user to configure the reaction module by selecting responses to malicious or potentially malicious activity.

FIG. 12 is a displayed web page 1200 illustrating the user device 104 enabling the user to configure the reaction module 140 by selecting responses to malicious or potentially malicious activity. The displayed web page 1200 is displayed at a point in time after the use has selected responses. The user device 104 displays the message display 902 which includes the following message: "Hello Bob! You have configured the reactor module by selecting the responses to the malicious or potentially malicious activity."

The user device 104 displays the following four selectable responses 1202: 1) "Alert when we reach a threshold of 10"; 2) "Provide a ticket to: Team A"; 3) "Mitigate by Network Isolation"; 4) "Generate data—Your data url is: https://example.com". In this example, as shown by selected responses 1204(1), 1204(2), and 1204(3), the user has selected the following three responses: 1) "Alert when we reach a threshold of 10"; 2) "Provide a ticket to: Team A"; 3) "Generate data—Your data url is: https://example.com".

The first selectable response 1202 includes a threshold field 1206 configured to enable the user to enter a value for the first selectable response 1202.

The second selectable response 1202 includes a team field 1208 configured to enable the user to enter a value associated with a team. In this example, the user entered "Team A", resulting in the sentinel node 102 providing a ticket to one or more computing devices (e.g., user device 104) in response to a determination of an occurrence of a malicious or potentially malicious activity.

The third selectable response 1202 includes a mitigation field 1210 configured to enable the user to enter a value for the first selectable response 1202. In this example, the user entered "Network Isolation", resulting in the sentinel node 102 terminating any network connections of the computing device which performed the malicious or potentially malicious activity. The fourth selectable response 1202 includes a URL field 1212 configured to display a URL in which the user may view data about the malicious or potentially malicious activity.

Those having ordinary skill in the art will readily recognize that certain steps or operations illustrated in the figures above can be eliminated or taken in an alternate order. Moreover, the methods described above may be implemented as one or more software programs for a computer system and are encoded in a computer readable storage medium as instructions executable on one or more processors.

Embodiments may be provided as a computer program product including a non-transitory computer readable storage medium having stored thereon instructions (in compressed or uncompressed form) that may be used to program a computer (or other electronic device) to perform processes or methods described herein. The computer readable storage medium can be any one of an electronic storage medium, a magnetic storage medium, an optical storage medium, a quantum storage medium and so forth. For example, the computer readable storage media may include, but is not limited to, hard drives, floppy diskettes, optical disks, read-only memories ("ROMs"), random access memories ("RAMs"), EPROMs, EEPROMs, flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments and situations. Although the present disclosure is written with respect to specific embodiments and implementations, various changes and modifications may be suggested to one skilled in the art and it is intended that the present disclosure encompass such changes and modifications that fall within the scope of the appended claims.

What is claimed is:

1. A system comprising:
a server computing device configured to:
provide an application programming interface configured to receive inputs to generate configuration data, wherein the configuration data is provided by a user device, the configuration data comprising:
emitter configuration data comprising information causing one or more emitter nodes to provide event data to the server computing device, the event data comprising recorded information about one or more activities;
sensor configuration data comprising information about selecting one or more attributes, the one or more attributes representative of information about activities associated with the one or more emitter nodes;
filter configuration data comprising information about selecting one or more algorithms, wherein the selected one or more algorithms are used for analyzing the one or more selected attributes; and
reaction configuration data comprising information about selecting one or more responses to a determination of an occurrence of a potentially malicious activity;
provide the emitter configuration data to the one or more emitter nodes;
generate parsed data by transforming the event data according to the sensor configuration data, wherein the parsed data includes attribute data comprising information associated with one or more activities;
in response to a determination that a potentially malicious activity occurred:
generate alert data representative of the occurrence of the potentially malicious activity; and
generate reaction data comprising information about one or more responses to the occurrence of the potentially malicious activity.

2. The system of claim 1, wherein the event data includes at least one of:
a first event entry comprising information about a source of a performed action;
a second event entry comprising information about a description of the performed action; or
a third event entry comprising information about an object that the source is performing the action on.

3. The system of claim 1, wherein the server computing device is further configured to:
determine an amount of resources that would be consumed by performing at least the generation of at least one of the event data, the alert data, or the reaction data; and
in response to a determination that the amount of the resources consumed exceeds a designated amount, cause at least one computing device to operate in cooperation with the server computing device to perform at least one of the generation of the at least one of the event data, the alert data, or the reaction data.

4. The system of claim 1, wherein the server computing device is configured to provide second emitter configuration data to the one or more emitter nodes, the second configuration data comprising information causing the one or more emitter nodes to terminate providing the event data to the server computing device.

5. A method comprising:
causing a computing device to implement one or more services, wherein the one or more services are configured to:

provide an application programming interface;

access event data comprising recorded information about one or more activities;

access sensor configuration data comprising information about selecting one or more attributes representative of information about one or more activities associated with one or more emitter nodes;

generate parsed data by transforming the event data according to the sensor configuration data, wherein the parsed data includes:
- actor data comprising information about a source of a performed action;
- action data comprising information about the performed action;
- entity data comprising information about an object that the source is performing the action on; and
- attribute data comprising information associated with one or more activities associated with the emitter node;

determine that a potentially malicious activity occurred by analyzing the parsed data; and generate alert data representative of the occurrence of the potentially malicious activity.

6. The method of claim 5, wherein:
the event data includes event entries comprising information about the one or more activities; and
the transformation of the event data includes at least one of:
removing at least one of the event entries; or
supplementing the event data with the attribute data.

7. The method of claim 5, wherein:
the event data includes event entries; and
the attribute data is generated based on the event entries.

8. The method of claim 5, wherein the potentially malicious activity comprises at least one of:
changing a document designated as security sensitive; or
a second computing device connecting to an unauthorized computing device.

9. The method of claim 5, wherein the one or more services are configured to:
receive filter configuration data comprising information about selecting an algorithm; and
apply the selected algorithm to the selected attributes.

10. The method of claim 5, wherein the one or more services are configured to determine the potentially malicious activity occurs in response to a designated activity occurring in an amount exceeding a designated number.

11. The method of claim 10, wherein the one or more services are configured to set the designated number based on threshold data comprising information representative of the designated number, wherein the threshold data is provided by a user device in communication with the computing device.

12. The method of claim 5, wherein:
the one or more services are configured to generate reaction data comprising information about one or more responses to the occurrence of the potentially malicious activity; and
the one or more responses include at least one of:
providing an alarm indicating the occurrence of the potentially malicious activity;
providing a ticket comprising information about the occurrence of the potentially malicious activity; or
terminating a communicate connection of a second computing device associated with the potentially malicious activity.

13. The method of claim 5, wherein:
one or more emitter nodes provide the event data, the one or more emitter nodes comprising at least one of a second computing device or an application;
the one or more emitter nodes provide the event data in response to receiving emitter configuration data comprising information causing the one or more emitter nodes to provide event data to the computing device; and
a user device provides the emitter configuration data to the computing device.

14. The method of claim 5, wherein the one or more services are configured to generate metric data indicative of resources consumed to perform at least one of the generation of the parsed data, the determination of the potentially malicious activity, or the generation of the alert data.

15. The method of claim 14, wherein the one or more services are configured to, in response to a determination that an amount of the resources consumed exceeds a designated amount, cause at least one computing device to operate in cooperation with the server computing device to perform at least one of the generation of the parsed data, the determination of the potentially malicious activity, or the generation of the alert data.

16. The method of claim 5, wherein:
the event data includes event entries comprising information about the one or more activities; and
the transformation of the event data includes assigning the event entries to designated fields.

17. A computing device comprising:
a hardware processor;
an input device operatively connected to the hardware processor; and
a memory device in communication with the hardware processor, the memory device storing instructions, which when executed by the hardware processor, cause the hardware processor to:
generate emitter configuration data comprising information causing one or more emitter nodes to provide event data to a server computing device, the event data comprising recorded information about one or more activities, wherein the server computing device is in communication with the hardware processor;
provide the emitter configuration data to the server computing device;
generate sensor configuration data comprising information about selecting one or more attributes to be analyzed, the one or more attributes representative of information associated with the one or more activities;
provide the sensor configuration data to the server computing device;
generate filter configuration data comprising information about selecting one or more algorithms for analyzing the one or more attributes;
provide the filter configuration data to the server computing device;
generate reaction configuration data comprising information about selecting one or more responses once a determination of an occurrence of a potentially malicious activity occurs;
provide the reaction configuration data to the server computing device; and
present reaction data comprising information about one or more responses to the occurrence of the potentially malicious activity.

18. The computing device of claim 17, wherein the reaction data is generated in response to the server computing device determining an occurrence of a potentially malicious activity.

19. The computing device of claim 17, wherein the hardware processor is configured to:
   generate threshold data comprising information representative of a designated number; and
   provide the threshold data to the server computing device, wherein the server computing device determines the occurrence of the potentially malicious activity in response to a designated activity occurring in an amount exceeding the designated number.

20. The computing device of claim 17, wherein the hardware processor is configured to generate second emitter configuration data comprising information causing different one or more emitter nodes to provide the event data to the server computing device.

* * * * *